Figure 1:
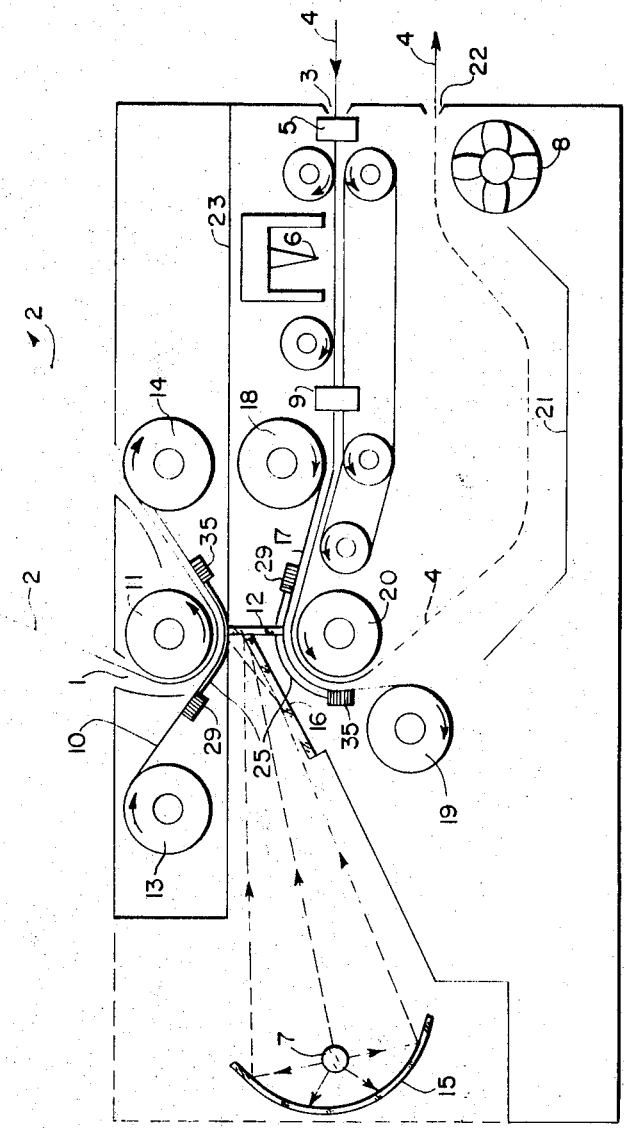

United States Patent
Moraw

[15] 3,659,935

[45] May 2, 1972

[54] COPYING METHOD AND APPARATUS

[72] Inventor: Roland Moraw, Wiesbaden-Biebrich, Germany

[73] Assignee: Kalle Aktiengesellschaft, Wiesbaden-Biebrich, Germany

[22] Filed: Dec. 22, 1969

[21] Appl. No.: 886,889

[30] Foreign Application Priority Data

Dec. 23, 1968 Germany..................P 18 16 591.8

[52] U.S. Cl....................................355/1, 352/130, 355/50, 355/67
[51] Int. Cl.....................................G03b 27/50, G03b 27/54
[58] Field of Search..................355/2, 50, 51, 67, 1; 352/130

[56] References Cited

UNITED STATES PATENTS

| | | |
|---|---|---|
| 2,194,808 | 3/1940 | Pooley........................................355/50 |
| 2,453,031 | 11/1948 | Olds...........................................355/50 |
| 3,175,481 | 3/1965 | Lahr...........................................355/1 |
| 3,194,142 | 7/1965 | Black..........................................355/1 |
| 3,232,201 | 2/1966 | Frank et al..................................355/1 |
| 3,398,667 | 8/1968 | Hicks..........................................355/1 |
| 3,531,193 | 9/1970 | Diehl..........................................352/130 |

*Primary Examiner*—Samuel S. Matthews
*Assistant Examiner*—Richard A. Wintercorn
*Attorney*—James E. Bryan

[57] ABSTRACT

This invention relates to a copying apparatus comprising a housing having therein a reflex exposure means, a bridge-like glass fiber optic, means for moving an optically clear spacing film together with copying material past one end of the fiber optic, and means for moving an optically clear spacing film together with a master past the other end of the fiber optic and in a direction opposite to that of the copying material.

9 Claims, 5 Drawing Figures

Patented May 2, 1972

3,659,935

4 Sheets-Sheet 1

INVENTOR
ROLAND MORAW

BY *James E. Bryan*
ATTORNEY

INVENTOR
ROLAND MORAW

Patented May 2, 1972

3,659,935

4 Sheets-Sheet 4

INVENTOR
ROLAND MORAW

BY *James E. Bryan*
ATTORNEY

COPYING METHOD AND APPARATUS

This invention relates to a copying apparatus provided with a reflex exposure device, in which a copying material and a master are conducted in opposite directions at a close distance past the front ends of a bridge-like fiber optic.

The known devices of this type are not satisfactory in all respects. In particular, an exact guidance of the master past the fiber optic and at a close and constant distance therefrom, and the admission of light to the narrow gap between the fiber optic and the master have proved technically difficult. Thus, a device of known type in which a transparent intermediate part is fixed to the end of the fiber optic facing the original has the disadvantage that such fixed spacers can be attached only with difficulty over relatively wide bridge-like glass fiber optics having a width of reproduction of several decimeters. The intermediate parts, which are made of glass or plastic material, are mechanically worn by the material to be copied which is conducted past them, so the quality of reproduction diminishes, while their replacement is relatively cumbersome.

In the past, light has been irradiated into the narrow gap between fiber optic and original by light sources mounted beside the fiber optic at a small distance therefrom, because the light rays must impinge as vertically as possible upon the gap to be reproduced, to avoid a diffusion of light. Consequently, the light source has been placed between the feeding devices for the master and the copying material, so that their distance and, as a result thereof, the height of the fiber optic had to be larger than absolutely necessary. In addition to their poor ventilability, such apparatuses require a relatively large space.

The copying apparatus according to the invention, which avoids these drawbacks, includes optically clear spacing films which move between the copying material and one front end of the glass fiber optic, and between the master and the other front end of the glass fiber optic, in the direction of travel of the copying material and the master, respectively, and, if desired, a light source mounted at a small angle to the exposure plane, which may be combined with a deflecting mirror positioned within the path of rays from the source. According to a further feature of the invention, the copying apparatus includes a device for the application of an oil film between the spacing films and the glass fiber optic.

A bridge-like glass fiber optic consists of a plurality of optical fibers for transmitting reflections of light directly from a line on the document to remote points on the sheet of copying material lying in a line corresponding to said line. In addition to glass, transparent plastic material also may be used as a material for the glass fiber optic.

Figure 2:
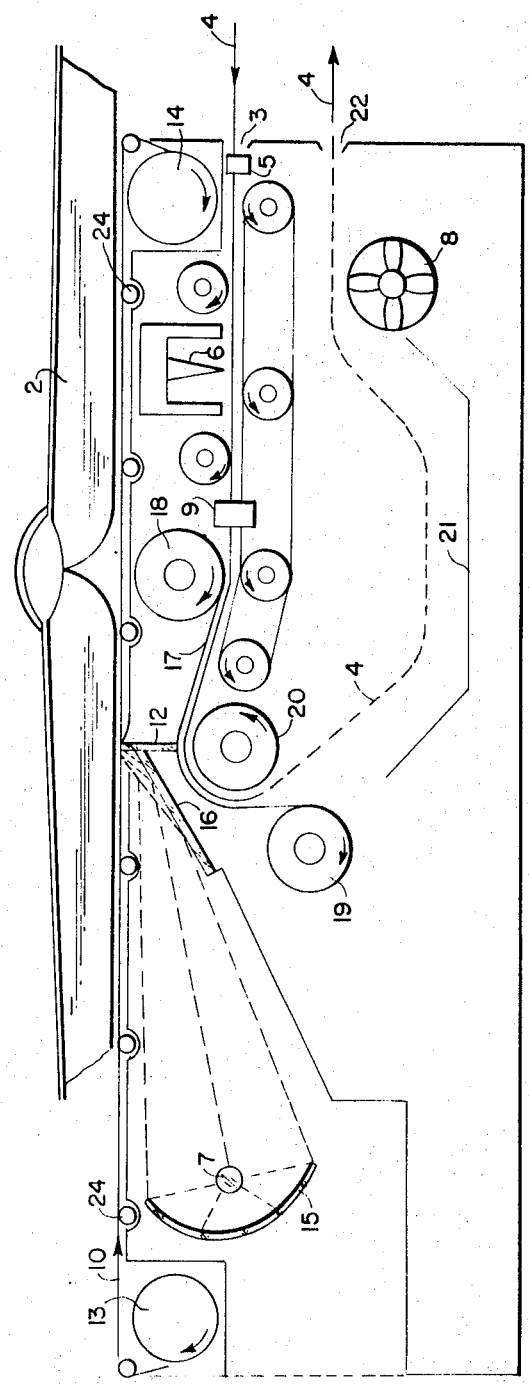
Figure 3:
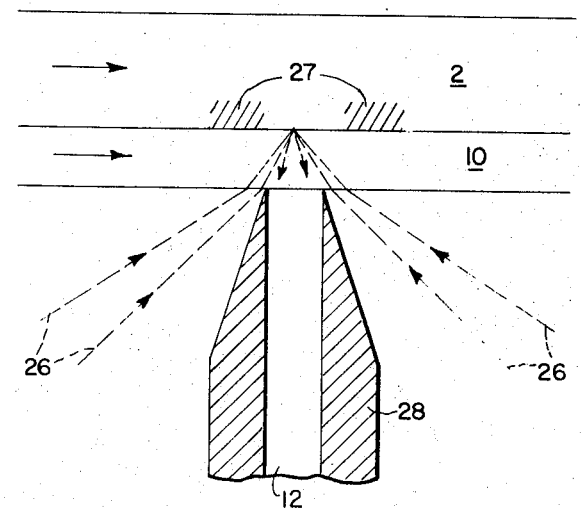
Figure 4:
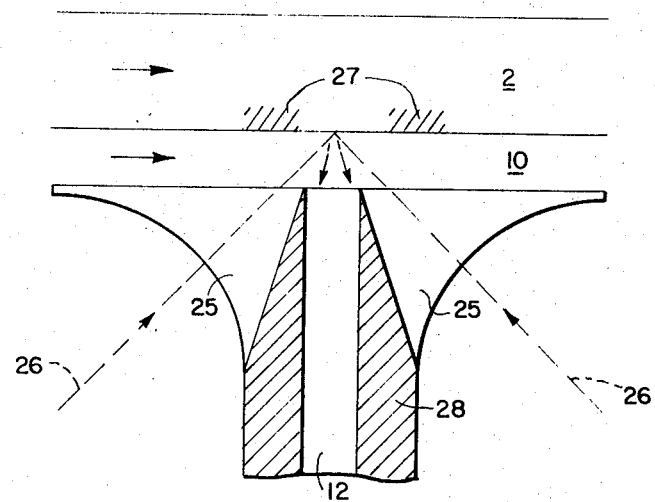
Figure 5:
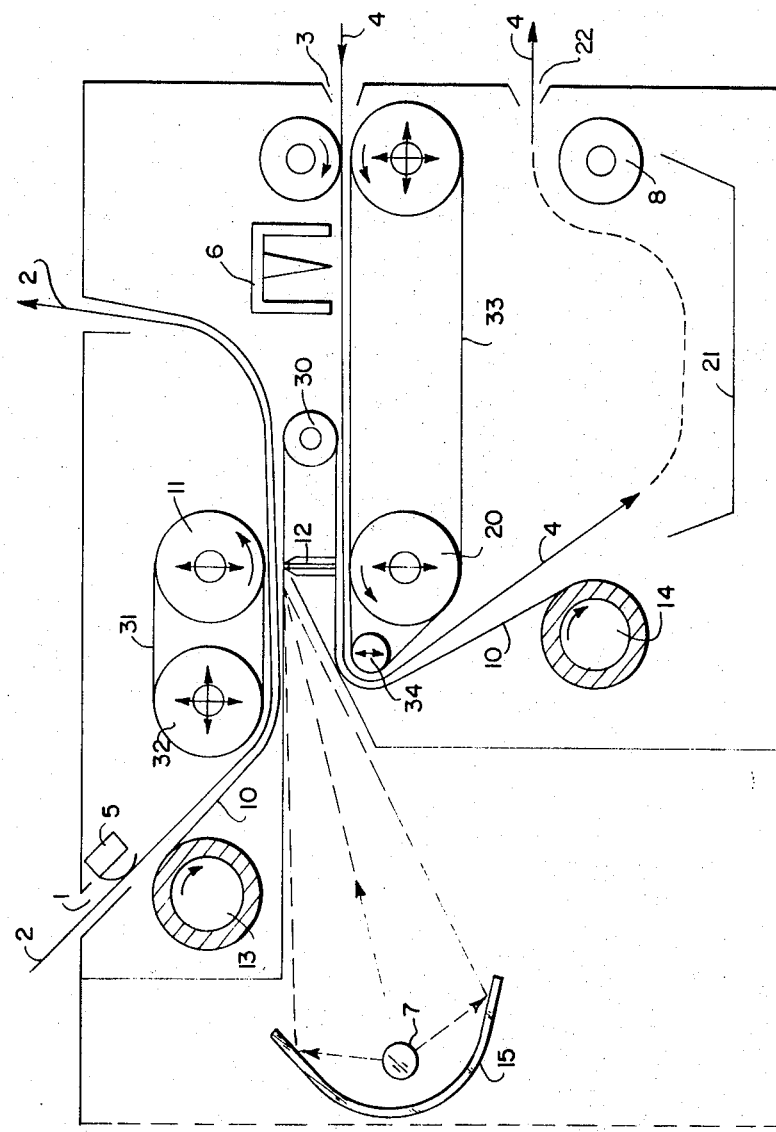

The invention will be further illustrated by reference to the accompanying drawings in which FIG. 1 is a copying apparatus according to the invention adapted to the use of masters in the form of sheets, FIG. 2 is a corresponding apparatus adapted to making copies from books, FIG. 3 is a detail showing the front end of the fiber optic facing the master, FIG. 4 is the fiber optic with an oil film applied thereto, and FIG. 5 is the copying apparatus according to the invention in which only one spacing film is provided.

FIG. 1 shows, by way of example, an electrophotographic copying apparatus. Through a slot 1 in the cover, the sheet-like master 2 is inserted into the apparatus while it is at rest. Through a slot 3 in the front of the apparatus, zinc oxide paper is introduced, e.g., with its zinc oxide layer facing upwardly. Simultaneously, a contact switch 5 is closed which actuates the feed mechanism for the zinc oxide paper, the needle corona 6, the lamp 7 and the ventilator 8. After charging, the leading edge of the zinc oxide paper closes a second contact switch 9 which actuates the feed mechanism for the master. Together with the spacing film 10, the master 2 is guided around a flexibly mounted pressure roller 11 and past the glass fiber optic 12. For this purpose, the film 10 is unrolled from the reel 13 and wound onto the reel 14. The light source 7 is an intensive tubular lamp, e.g. a tungsten iodide lamp which is partially surrounded by an elliptical reflector 15. The filament is in one of the focal lines of the reflector. The image of the lamp in the other focal line is projected by means of a mirror 16 through the spacing film 10 onto the master 2 while it is directly over the glass fiber optic 12. The light which, being reflected by the master 2, is image-wise differentiated, penetrates the spacing film 10 and the glass fiber optic 12 and strikes the charged zinc oxide paper 4. For improvement of its slidability and for guidance of the zinc oxide paper, a transparent, thin film 17 is also provided on this side of the glass fiber optic, the film being unrolled from the reel 18 and wound onto the reel 19. Reels 13 and 18 are provided with a mechanism for rewinding the films 10 and 17 when the apparatus is at rest. The elastic pressure of the zinc oxide paper on the fiber optic is caused by a roller 20 which, similarly to roller 11, is provided with a covering of elastic material. Further, it is advisable to provide the rollers 20 and 11 with a flexibly adjustable mounting, so that the pressure exerted upon the fiber optic is no higher than necessary for the production of a perfectly satisfactory reproduction. As the figure shows in a very simple manner, the zinc oxide paper 4 carrying the charge image is then passed through a trough 21 containing a developer liquid. Any excess of developer liquid is squeezed off, and the zinc oxide paper is dried by means of the ventilator 8 and delivered from the apparatus through the slot 22 in the front of the apparatus.

The spacing film 10 may be an optically clear, tear-resistant film, e.g. a cellulose acetate film, a polypropylene film, a polyteraphthalic acid ester film or the like, which, additionally, may be passed through a cleaning station, e.g. between two felt plates, in order to prevent a grinding action by dust particles. Since films of this type are commercially available in definite thicknesses from 0.01 to 0.1 mm and higher, it is thus achieved in a very simple manner that the master is conducted past the glass fiber optic at a constant distance therefrom while damage of the surface of the glass fiber optic or of the material to be copied by friction is substantially avoided.

According to a further feature of the invention, the glidability of the film on the front end of the fiber optic may be further increased by means of a device 29 which applies an oil film 25 between the spacing films 10 and 17 and the glass fiber optic 12. This may be achieved, e.g., by means of a felt strip soaked in an immersion oil, the oil being removed again by a dry felt strip 35 before the film is wound up. Spacing films made of polyterephthalic acid esters are particularly suitable for this embodiment of the invention.

As can be seen from FIG. 1, the light source 7 used for irradiation of the exposure gap between the glass fiber optic 12 and the original 2 may be mounted at almost the same level as the fiber optic when a deflecting mirror is used, because the deflecting mirror 16 ensures that the light rays are beamed as vertically as possible into the exposure gap. This arrangement of the light source remote from the other treating stations is a very advantageous construction, since it facilitates cooling of the apparatus and considerably reduces the space occupied by the apparatus as a whole. In particular, the height of the glass fiber optic may be substantially reduced in the embodiment of the apparatus according to the invention. Further, it has been found that it is possible to omit the deflecting mirror if a somewhat larger requirement for space is tolerated and the light source is positioned in such a manner that the master is irradiated under an acute angle between 10° and 45°, preferably between about 15° and 35°, to the exposure plane 23.

FIG. 2 shows a corresponding device which is adapted for the preparation of copies from books, identical numerals referring to the same elements as in FIG. 1. Spacing film 10 is unrolled from the reel 13 and wound onto the reel 14, after passing over the supporting rolls 24. In addition to books, also sheet-like masters may be copied by means of this apparatus, it being of advantage when a rubber plate is placed upon the master in order to hold it down.

FIGS. 3 and 4 show the path of the light rays in the exposure gap. Numeral 25 designates the oil film between the fiber optic and the spacing film, 26 is the direction of incident light, 27 are the image areas of the master, and 28 is the mounting support of the fiber optic. As can be seen from FIG. 4, the oil film 25 has the additional advantage of preventing a deflection of the light at the surface of the film, so that an almost vertical irradiation of the fiber optic is possible. The light loss by reflection as a result of the light reflected from the master when it passes from the film 10 to the glass fiber optic is also reduced by the immersion oil.

In a practical test, a copying speed of 2 m/min. was achieved with panchromatically sensitized zinc oxide paper in an apparatus as in FIG. 1 equipped with a glass fiber optic of 0.1 mm depth and 1.2 cm height. Light from a rod-shaped tungsten iodide lamp (67 watts/cm) was irradiated through a cylindrical lens condenser ($f = 5$ cm, width $= 5$ cm). The filament was projected at a 1:1 scale onto the master immediately above the glass fiber optic through a 0.1 mm thick cellulose acetate film between the master and the glass fiber optic.

By different driving speeds on the side of the master and the side of the copying material, the scale of reproduction may be varied in one dimension. This may be undesirable, because, normally, a reproduction is desired which has the same dimensions as the master. For this purpose, the optically clear spacing films on the side of the master and the side of the copying material must be moved synchronously, at the same speed.

Mechanical driving mechanisms suitable for this purpose are known which enable a synchronous feed, but this involves additional expense for the apparatus, because gear drives or pulley drives must be installed in the copying apparatus.

According to another feature of the invention, a very simple synchronization of operations is achieved by employing only one optically clear spacing film 10 which is guided around the roller 30 and may be in the form of an endless belt.

The spacing film on the side of the master glides, with the master, past one front end of the fiber optic, is then deflected by a roller, and moves with the copying material along the other front side of the fiber optic. In this manner, the transport of the master and of the copying material is effected by one spacing film only which is unrolled from and wound onto appropriate reels. Although it is possible for all carrier rollers of the spacing film to be driven, it suffices if the re-wind reel, e.g., is connected to any type of drive. In this manner, the conveying system is substantially simplified and less susceptible to mechanical trouble.

The spacing film 10 alone ensures that the master and the copying material are held closely to the fiber optic; further, it causes the master and the copying material to pass over the fiber optic in a sliding movement, with a minimum of friction, and synchronizes the feed of the master and the copying material.

An appropriately equipped copying apparatus is described in detail with reference to FIG. 5:

The sheet-like master 2 is inserted through a slot 1 in the cover plate into the copying apparatus while it is not in operation. The copying material 4, e.g. a zinc oxide paper, is inserted with its light-sensitive surface facing upwardly into a slot 3 at the front end of the apparatus. Advantageously, the copying material is introduced from within the apparatus, from a stock pile or a delivery spool (not shown). It is essential, however, that the distance over which the copying material 4 is fed is such that it arrives at the fiber optic 12 simultaneously with the master 2, which closes a contact switch 5 when it is inserted and thus starts the apparatus. The copying material is electrically charged under a needle corona 6. The master 2 is conveyed with the smooth, transparent, i.e. optically clear, spacing film 10 around the rollers 32 and 11, which are resiliently mounted in the direction of the arrows and are equipped with an endless belt 31, and past the glass fiber optic 12. For this purpose, the spacing film 10 is unrolled from a delivery reel 13. The spacing film 10 is guided around the deflector roll 30 and then conveys, in combination with the endless belt 33, the charged copying material past the other side of the glass fiber optic. After passing the roller 34, the spacing film 10 reaches the driven wind-up reel 14. The light source 7 is a high intensity tubular lamp, as described in connection with FIG. 1. The filament is in one of the focal lines of the reflector.

Either directly or via a deflector mirror (not shown), the lamp image is projected in the second focal line through the spacing film 10 onto the master 2, which is immediately above the glass fiber optic. The light reflected by the master 2, which thus is image-wise differentiated, passes through the spacing film 10 above the fiber optic 12, through the glass fiber optic 12 itself, and through the spacing film 10 beneath the glass fiber optic 12 and strikes the charged copying material 4 which is thus image-wise exposed. As shown in a very simple manner, the copying material 4 carrying the charge image is then conducted through a trough 21 containing a developer liquid. Any excess of developer liquid is squeezed off in the drying station 8. The copying material is dried, either by a current of air or by heat, and then delivered from the apparatus through the slot 22 in the front.

To produce sharp reproductions of images, the master 2 and the copying material 4 must be conducted, together with the spacing film 10, in close, continuous contact with the glass fiber optic 12. For this reason, the pressure rollers 11 and 20 are resiliently mounted in the direction of the arrows and may be further provided with a covering of elastic material, if desired. The pressure rollers 11 and 20 alone are sufficient of obtain a comparatively satisfactory operation. The pressure of the rollers 11 and 20 on the glass fiber optic 12 should not be greater than is necessary to produce the image and the rollers must be capable of compensating, without auxiliary rollers, the upward and downward forces exerted by the spacing film 10; they thus should be mounted less resiliently than otherwise would be possible. To improve the guidance of the spacing film 10 and, at the same time, compensate the vertical forces in the vicinity of the glass fiber optic 12, it is therefore advisable to mount the auxiliary rollers 32 and 34 in such a manner that the spacing film 10 is stretched only horizontally in the neighborhood of the glass fiber optic 12. Appropriately mounted rollers also may perform the function of the endless belts 31 and 33 just described.

The term "vertical" as used herein refers to the arrangement as shown in the figures and is normally to be understood in reference to the glass fiber optic.

When it is relieved in the vertical direction, the pressure of the spacing film 10 on the glass fiber optic 12 may be relatively low, so that there is little friction and, consequently, little abrasive action between the spacing film and the glass fiber optic 12. Dust particles may be removed from the spacing film 10 by means of wipers of soft felt (not shown).

Over a prolonged period of operation, a certain abrasion will be inevitable. Since the relatively inexpensive spacing films 10 of cellulose acetate, polypropylene or, preferably, of polyester of a thickness in the range of about 0.01 mm to 0.1 mm are softer than the relatively expensive glass fiber optic 12, scratches primarily occur on the spacing film 10. When a fiber optic of plastic material is used, the scratching problem is immaterial. To avoid too frequent a replacement of the spacing film 10, a certain stock of film is maintained on the reel 13. It is thus possible to feed a length of film corresponding to the length of the master from the reel 13 to the reel 14 and to rewind it after completion of the copying process by means of a suitable rewinding mechanism, which may be in the form of spiral springs, for example. After the length of film has been repeatedly pulled back and forth and is worn out, it is unrolled from the reel 13 and wound onto the reel 14, and a new length of film is conducted past the glass fiber optic 12. The worn length of spacing film 10 may be wound up in the interior of reel 14 to avoid an undue alternation of the outer radius of the driven reel 14. Alternatively, instead of periodically moving the spacing film 10 to and fro, the entire supply of spacing film 10 may be unrolled from the reel 13 and wound onto the reel 14 in the course of numerous copying operations, and only then rewound. By means of suitable devices, such as an additional drive roll (not shown) which presses upon the reel 14, care must be taken that the circumferential speed of the reel 14 remains constant.

The invention is not limited to the process described in the figures, but can be used in connection with any copying apparatus of this type. The spacing film 10 also may be in the form of an endless belt.

In an example of operation which was carried out in practice, a copying speed of 6 m/min. was achieved with panchromatically sensitized zinc oxide paper in a copying apparatus in which the spacing film was arranged as shown in FIG. 5, using a bridge-like glass fiber optic of 5 cm length, 9 mm height, and 0.2 mm depth. The light of a rod-like tungsten iodide lamp (67 watts/cm) was used for irradiation through a cylindrical condenser ($f=5$ cm, width $=5$ cm). The filament was reproduced at scale 1 : 1 directly above the glass fiber optic through a $50\mu$ thick film of polyterephthalic acid ester. The resolution limit was at writings of 1 mm size.

It will be obvious to those skilled in the art that many modifications may be made within the scope of the present invention without departing from the spirit thereof, and the invention includes all such modifications.

What is claimed is:

1. A copying apparatus comprising a housing having therein a reflex exposure means, a bridge-like glass fiber optic, means for moving an optically clear spacing film together with copying material past one end of the fiber optic, and means for moving an optically clear spacing film together with a master past the other end of the fiber optic and in a direction opposite to that of the copying material, said spacing films being located intermediate said copying material and master, respectively, and said fiber optic.

2. A copying apparatus according to claim 1 in which the exposure means includes a light source mounted at an acute angle to the plane of exposure.

3. A copying apparatus according to claim 2 including a deflecting mirror mounted in the path of rays from the light source.

4. A copying apparatus according to claim 1 in which a single optically clear spacing film is employed.

5. A copying apparatus according to claim 1 in which a pair of optically clear spacing films is employed.

6. A copying apparatus according to claim 1 including means for the application of an oil film between the spacing films and the glass fiber optic in contact therewith.

7. A copying apparatus according to claim 1 including roller means for ensuring that the films are stretched only horizontally when adjacent the fiber optic.

8. A copying apparatus according to claim 1 including a sufficient supply of optically clear spacing film to ensure a repeated transfer between a wind-off reel and a wind-up reel.

9. A method of copying which comprises moving an optically clear spacing film together with copying material past one end of a bridge-like glass fiber optic, and moving an optically clear spacing film together with a master past the other end of the fiber optic in a direction opposite to that of the copying material while exposing the master to a light source, said spacing films being located intermediate said copying material and master, respectively, and said fiber optic.

* * * * *